United States Patent
Satanek et al.

(10) Patent No.: US 11,528,160 B2
(45) Date of Patent: Dec. 13, 2022

(54) APPLIANCE NETWORK WITH MESSAGING

(71) Applicant: WHIRLPOOL CORPORATION, Benton Harbor, MI (US)

(72) Inventors: Brandon Satanek, Stevensville, MI (US); Wen Shi, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/405,589

(22) Filed: Aug. 18, 2021

(65) Prior Publication Data

US 2021/0385105 A1 Dec. 9, 2021

Related U.S. Application Data

(60) Continuation of application No. 17/036,714, filed on Sep. 29, 2020, now Pat. No. 11,115,231, which is a continuation of application No. 16/728,291, filed on Dec. 27, 2019, now Pat. No. 10,819,534, which is a continuation of application No. 16/446,707, filed on Jun. 20, 2019, now Pat. No. 10,594,507, which is a continuation of application No. 16/224,055, filed on Dec. 18, 2018, now Pat. No. 10,361,881, which is a continuation of application No. 15/891,738, filed on Feb. 8, 2018, now Pat. No. 10,200,209, which is a continuation of application No. 15/647,382, filed on Jul. 12, 2017, now Pat. No. 9,929,874, which is a (Continued)

(51) Int. Cl.
| | |
|---|---|
| *H04L 12/28* | (2006.01) |
| *H04W 4/12* | (2009.01) |
| *H04L 51/18* | (2022.01) |
| *H04W 4/70* | (2018.01) |

(52) U.S. Cl.
CPC ...... *H04L 12/2823* (2013.01); *H04L 12/2803* (2013.01); *H04L 12/2814* (2013.01); *H04L 51/18* (2013.01); *H04W 4/12* (2013.01); *H04W 4/70* (2018.02); *H04L 2012/285* (2013.01); *H04L 2012/2841* (2013.01)

(58) Field of Classification Search
CPC .................................................. H04L 12/2823
See application file for complete search history.

(56) References Cited

U.S. PATENT DOCUMENTS

| | | |
|---|---|---|
| 7,363,031 B1 | 4/2008 | Aisa |
| 7,778,654 B2 | 8/2010 | Ahn et al. |

(Continued)

FOREIGN PATENT DOCUMENTS

| | | |
|---|---|---|
| KR | 20050078883 A | 8/2005 |
| KR | 101049929 B1 | 7/2011 |

OTHER PUBLICATIONS

LG HomeChat at http://www.lghomechat.com/us/, LG Electronics, accessed Mar. 18, 2016.

(Continued)

*Primary Examiner* — David Bilodeau
(74) *Attorney, Agent, or Firm* — McGarry Bair PC

(57) ABSTRACT

An appliance, communication system, and method thereof for a communicating on a network including an appliance interactive display coupled to an appliance communication module. The appliance communication module is configured to receive a message having an embedded interactive element configured to operate a functionality of the appliance embedded into the message. A return message is sent that relates to a post-cycle of operation of the embedded interactive element.

21 Claims, 8 Drawing Sheets

Related U.S. Application Data division of application No. 14/973,986, filed on Dec. 18, 2015, now Pat. No. 9,742,581.

(56) References Cited

U.S. PATENT DOCUMENTS

| | | |
|---|---|---|
| 8,140,663 B2 | 3/2012 | Brown |
| 8,185,139 B1 | 5/2012 | Mangal |
| 9,497,595 B2 | 11/2016 | Shin et al. |
| 2004/0088364 A1 | 5/2004 | Yamadaji |
| 2004/0103153 A1 | 5/2004 | Chang et al. |
| 2005/0184852 A1 | 8/2005 | Lee |
| 2006/0187034 A1 | 8/2006 | Styers et al. |
| 2006/0220834 A1 | 10/2006 | Maeng |
| 2008/0104212 A1 | 5/2008 | Ebrom et al. |
| 2008/0108388 A1 | 5/2008 | Ebrom et al. |
| 2008/0125911 A1 | 5/2008 | Ebrom et al. |
| 2011/0119346 A1 | 5/2011 | Kim et al. |
| 2012/0309436 A1 | 12/2012 | Lan et al. |
| 2012/0316984 A1 | 12/2012 | Glassman |
| 2013/0041951 A1 | 2/2013 | Lee et al. |
| 2013/0214935 A1 | 8/2013 | Kim et al. |
| 2013/0278384 A1 | 10/2013 | McDowell et al. |
| 2014/0081433 A1 | 3/2014 | Cheong et al. |
| 2014/0167929 A1 | 6/2014 | Shim et al. |
| 2014/0188463 A1 | 7/2014 | Noh et al. |
| 2014/0195383 A1 | 7/2014 | Kim et al. |
| 2015/0163070 A1 | 6/2015 | Barrett |
| 2015/0207644 A1 | 7/2015 | An et al. |
| 2015/0295726 A1 | 10/2015 | Bland |
| 2016/0373270 A1 | 12/2016 | Yang et al. |
| 2017/0078109 A1 | 3/2017 | Han et al. |

OTHER PUBLICATIONS

Comcast Spotlight Interactive Television at http://www.comcastspotlight.com/ad-solutions/overview/ad-solutions-interactive-television-itv, accessed Mar. 18, 2016.

European Search Report for Counterpart EP16198689.8, dated May 8, 2017.

APPLIANCE NETWORK WITH MESSAGING

CROSS-REFERENCE TO RELATED APPLICATIONS

This application is a continuation of U.S. application Ser. No. 17/036,714, filed on Sep. 29, 2020, issued as U.S. Pat. No. 11,115,231 on Sep. 7, 2021, which is a continuation of U.S. application Ser. No. 16/728,291, filed Dec. 27, 2019, issued as U.S. Pat. No. 10,819,534 on Oct. 27, 2020, which is a continuation of U.S. application Ser. No. 16/446,707, filed Jun. 20, 2019, issued as U.S. Pat. No. 10,594,507 on Mar. 17, 2020, which is a continuation of U.S. application Ser. No. 16/224,055, filed Dec. 18, 2018, issued as U.S. Pat. No. 10,361,881 on Jul. 23, 2019, which is a continuation of U.S. application Ser. No. 15/891,738, filed Feb. 8, 2018, issued as U.S. Pat. No. 10,200,209 on Feb. 5, 2019, which is a continuation of U.S. application Ser. No. 15/647,382, filed Jul. 12, 2017, issued as U.S. Pat. No. 9,929,874, on Mar. 27, 2018, which is a divisional of U.S. application Ser. No. 14/973,986, filed Dec. 18, 2015, issued as U.S. Pat. No. 9,742,581, on Aug. 22, 2017, all of which are incorporated herein by reference in their entirety.

BACKGROUND

Home appliances have user interfaces enabling a user to operate and interact with the appliance. As technology advances, users are increasingly interested in the functionality associated with the appliances. Enabling the user to utilize the user interface in appliances beyond typical operation of the appliance can expand the capability of the appliance. However, typical interaction with the user interface of the appliance is limited to local usage of the appliance, limiting the functionalities of the appliance to within the local space of the user, such as the home or even a particular room within the home.

BRIEF DESCRIPTION

In one aspect, the disclosure relates to a communication system comprising a home appliance configured to perform a cycle of operation including an appliance interactive display coupled to an appliance communication module and a source in communication with the home appliance configured to send an interactive message including an embedded interactive element to the home appliance. The appliance communication module is configured to receive the interactive message from the source and the embedded interactive element is configured to operate a functionality of the appliance. A return message is sent that relates to a post-cycle of operation of the embedded interactive element.

In another aspect, the disclosure relates to a method of operating an appliance having an appliance interactive display coupled to an appliance communication module. The method comprises receiving in the appliance communication module an interactive message including an embedded interactive element having a functionality of the appliance embedded into the interactive message, displaying the interactive message including the embedded interactive element on the appliance interactive display, and sending a return message that relates to a post-cycle of operation of the embedded interactive element.

In another aspect, the disclosure relates to a home appliance configured to perform a cycle of operation and connected to a home network comprising an appliance interactive display coupled to an appliance communication module. The appliance communication module is configured to receive an interactive message having an embedded interactive element that is configured to operate a functionality of the home appliance. A return message is sent that relates to a post-cycle of operation of the embedded interactive element

DETAILED DESCRIPTION

Figure 1:
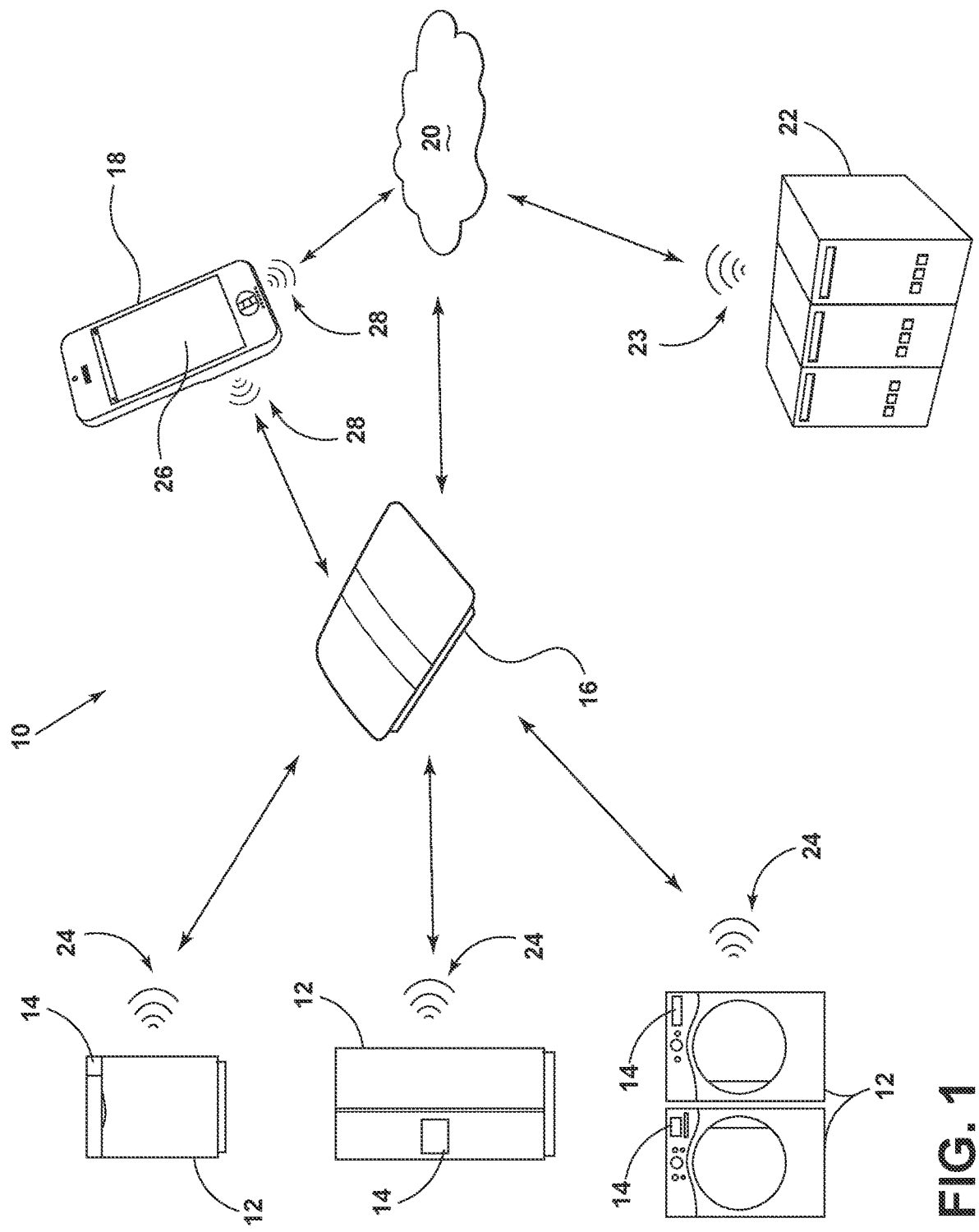
FIG. 1 is a schematic view of a network for casting information between a mobile device and an appliance.

FIG. 1 is a schematic view of a network 10 according to one aspect of the disclosure. The network 10 includes at least one appliance 12, each appliance 12 having an appliance interactive display 14. The appliances 12 can be in communication with a router 16. The router 16 provides for forwarding data between the appliances 12 and the other devices in the network 10. Optionally, the appliances 12 can be part of a home network or home area network (HAN) for communication with other devices within a home. The router 16 can be in communication with at least one mobile device 18 over the network 10, such as the HAN, and can be in communication with a communication network 20, such as the Internet or a wide area network (WAN). Furthermore, the router 16, and thus the appliances 12, can communicate with the mobile device 18 over the communication network 20. The appliances 12 and the mobile device 18 can further be in communication with a server 22, being a manufacturer server, for example.

The appliances 12 of the network 10 can be a home or domestic appliance that performs a particular job in a home, including those relating to cleaning, cooking, or food preservation. The home appliance, for example in the case of a dishwasher 12, can include a housing at least partially defining a treating chamber (not shown) and having an open face selectively closed for providing access to the treating chamber. The treating chamber can receive one or more article(s), and the appliance 12 can treat the article(s) according to a useful cycle of operation. Again, in the case of a dishwasher 12, the treating chamber can receive one or more dish(es), and the dishwasher 12 can perform a cleaning system on the dish(es) in the treating chamber. Other types of appliances include but are not limited to a refrigerator, a clothes washing machine, a clothes dryer, a freezer, a range, a stove, an oven, or a cooktop can be used with the network 10. All of these examples of home appliances can receive one or more article(s), and can perform a useful cycle of operation on the article(s). Other examples of appliance types typically found within a home and which can be used with the system include an air conditioner, a water heater, and a pool pump.

The appliances 12 can have an appliance communication module 24. The appliance communication module 24 can be a receiver, having transmission and reception capabilities for sending or receiving data over the network 10. The appliance communication module 24 sends and receives data or messages, to and from one or more mobile devices or databases. Such messages can include text, short message service (SMS), multimedia message service (MMS), or other types of messages, or transmit or receive data in another form that can be translated and displayed as a message. While it is illustrated that the appliance communication module 24 is in direct communication with the router 16, it is contemplated that the appliance 12 can be in communication with the mobile device 18 or the communication network 20 directly, such as over a cellular network, for example.

While three appliances 12 are shown in FIG. 1, it should be understood that the network 10 includes any number of appliances including more or less than three. The appliances 12 can be located within a single home or at a common location, and some or all can be part of the HAN.

The appliance interactive display 14 can provide users with access and control of the appliances 12 and/or the HAN. Through the appliance interactive display 14, a user can monitor and control operation of the appliances 12, as well as display additional information received over the network 10.

The router 16 can be utilized to provide communication from the appliances 12 over the network 10, providing information to a local mobile device 18 over the HAN or to the mobile device 18 remotely, such as over the communication network 20. The router 16 can operate as a forwarding and translating device, passing information over the network 10 or translating data to and from the appliances 12. It should be understood that the appliances 12 can alternatively communication directly with the mobile device 18 or the communications network 20, independent of the router 16, such as over a cellular network.

The mobile device 18 can communicate information with and/or respond to requests from the appliances 12 from a remote location, either inside or outside of the home or HAN. The mobile device 18 can include a data storage unit for storing data, such as historical usage or operational data for the appliances 12 based on information from the appliance communication module 24. The mobile device can have a mobile interactive display 26 permitting a user to receive, view, or send information related to the appliances 12. The mobile device 18 can have a mobile communication module 28 for communicating with the network 10 such as an antenna or receiver. The mobile communication module 28 sends and receives messages, to and from one or more appliances. Such messages can include text, SMS, MMS, or other types of messages, or transmit or receive data in another form that can be translated and displayed as a message. While the mobile device 18 is illustrated and generally described in relation to a mobile phone, it can, for example, comprise a smartphone, a tablet computer, a desktop computer, or a notebook computer.

The communication network 20 can be a private or public network, and can typically be a WAN (wide area network) such as the Internet. Similarly, the HAN can be a private or public network, and can typically be a LAN (local area network). The router 16 forwards data between the communication network 20 and the appliances 12. The HAN can have a different communication protocol than the communication network 20, in which case the router 16 or another device (not shown) can translate the data sent between the communication network 20 and the HAN between the different communication protocols. The router 16 can be a separate device in the HAN, or can be built into one of the appliances 12.

The server 22 can manage the appliance or mobile device's access to a centralized resource or service. The server 22 can connect to the communication network 20 via a server communication module 23. The server communication module 23 enables wired or wireless connection to the communication network 20, providing data sharing between the server 22 and the appliances 12. For example, the server 22 can be a server for a utility provider or retailer, and can communicate information to the network 10, which can comprise a database. The database can include particularized information, such as operational capabilities of a particular appliance. Furthermore, the server 22 can be a server of a manufacturer of the appliance 12 or some other third-party, and can communicate information similar to that of a utility provider or retailer, as well as functional information related to the operation of the appliance. The server 22 can also be used to generate data, such as a message, SMS, MMS, or otherwise to be send over the network 10 to the appliance 12. While only one server 22 is shown in FIG. 1, it should be understood that the network 10 can include multiple servers 22. The servers 22 can communicate with one or more utility providers, retailers, or manufacturers via the communication network 20 and, in the case where the communications network 20 is the Internet, can be the same communication network.

Additionally, the mobile device 18 can operate over the network 10 through the server 22. For example, the mobile device 18 can generate information such as a message and transmit the message to the server 22, where the message can be forwarded to the appliance 12.

An appliance communication module 24, such as a transceiver can be used to connect each appliance 12 to the router 16 and the network 10, and can be a separate or an external device or it can be carried by or, as shown in FIG. 1, built into the appliances 12. The appliance communication module 24 can communicate with the network 10 by a wireless or wired connection. The appliance communication module 24 is associated with the appliance 12 for both sending and receiving signals sent via the communication network 20 or the mobile device 18.

Appliances 12 have increasing scopes of functionality with advances in technology, being able to provide the user a more involved interaction at the appliance interactive displays 24. For example, a user can receive weather, media, or similar information displayed on the appliance interactive display 24. The increased functional capabilities of the appliances 12 provides for the potential to utilize an appliance 12 beyond typical operational parameters and cycles of operation in which the appliance 12 was originally intended.

Figure 2:
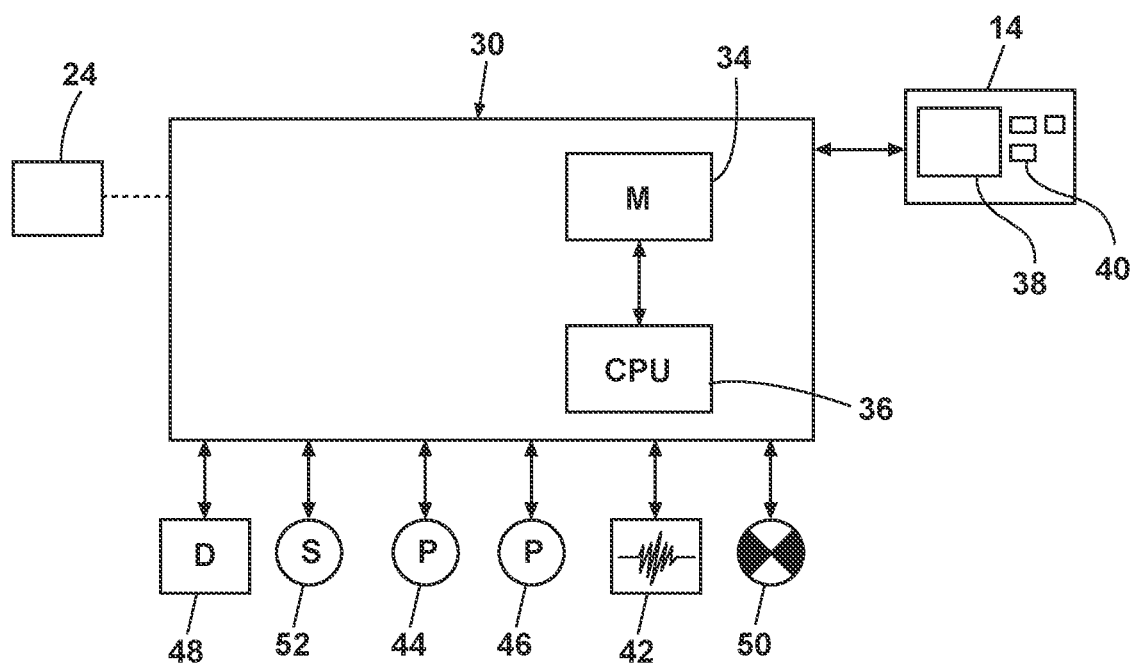
FIG. 2 is a schematic view of a controller of the appliance of FIG. 1.

Turning now to FIG. 2, a controller 30 for the appliances 12 is illustrated. The controller 30 controls the operation of the appliance 12 to implement one or more cycles of operation. The controller 30 can be located within one or more of the appliances 12 and be operably coupled with a control panel or the appliance interactive display 14 for receiving user-selected inputs and communicating information to the user. The appliance interactive display can include operational controls such as dials, lights, switches, and displays enabling a user to input commands, such as a cycle of operation, to the controller 30, and receive information. The appliance interactive display can, for example, include at least one display 38 and at least one selector or button 40. The display 38 can include lights or other discrete indicators with accompanying text, or a graphical user interface, such as a touch screen. The button 40 can include a push button, switch, or dial on the appliance interactive display 14 that a user physically actuates, or a virtual button on a graphical user interface, such the display 38. Alternatively or in addition, the appliance interactive display 14 can be used as a user interface for the appliance 12, and can be coupled with the controller 30. Options provide for the user to select or control how the appliance 12 operates and reacts input commands or options. Such selections are made at the appliance 12, through the appliance interactive display 14. Additionally, these selections, operative states, or other information transmits from the appliance 12 via the appliance communication module 24.

As illustrated in FIG. 2, the controller 30 has a memory 34 and a central processing unit (CPU) 36. The memory 34 can include any suitable computer-readable media. The memory 34 can store communication software configured to effect communication between the controller 30 and the network 10, such as the HAN or the communication network 20. The memory 34 also stores control software configured to effect one or more cycles of operation by the appliances 12. Examples, without limitation, of cycles of operation in the case of a dishwasher 12 include: Smart Wash, Pots/Pans, Normal Wash, China/Gentle, Fast Wash, and Quick Rinse. The CPU 36 can execute the communication and control software. The memory 34 also stores information, such as a database or table, and stores data received from one or more components of the appliance 12 and communicates the information to the controller 30. The database or table stores the various operating parameters for the one or more cycles of operation, including factory default values for the operating parameters and any adjustments to them effected by the control system or by user input.

The controller 30 operably couples with one or more components of the appliance 12 for communicating with and controlling the operation of the component to complete a cycle of operation. For example, in the case of a dishwasher as the appliance 12, the controller 30 can be operably coupled with a heater 42 for heating wash liquid during a cycle of operation, a drain pump 44 for draining liquid from the treating chamber, a recirculation pump 46 for recirculating wash liquid during a cycle of operation, a dispenser 48 for dispensing a treating agent during a cycle of operation, one or more valve(s) 50 for controlling the flow of liquid or air through the treating chamber, and one or more sensor(s) 52 to control the operation of these and other components to implement one or more of the cycles of operation. Non-limiting examples of a sensor 52 that can be communicably coupled with the controller 30 include a temperature sensor and a turbidity sensor to determine the soil load associated with a selected grouping of dishes, such as the dishes associated with a particular area of the treating chamber. In the case of other types of home appliances, the controller 30 operably couples with components typical to such appliances that are commonly controlled.

Similar to the appliance 12, the mobile device 18 can have a controller 30 being similar to that of FIG. 2. The controller 30 operates the mobile device 18 and implements control or operational software used in operation of the mobile device 18. The mobile device 18 can generate and send a message from the mobile device 18, such as a text message, SMS, MMS, or from a website or application.

Each of the appliance 12 and the mobile device 18 can utilize the controller 30 to display and run an application. The application can comprise software executed by the CPU 36 and stored in the memory 34. The appliance interactive display 14 or the mobile interactive display 26 displays the application while running. The application can include features or functionalities that a user can interact with at a user interface with the mobile or appliance interactive displays 14, 26.

Figure 3:
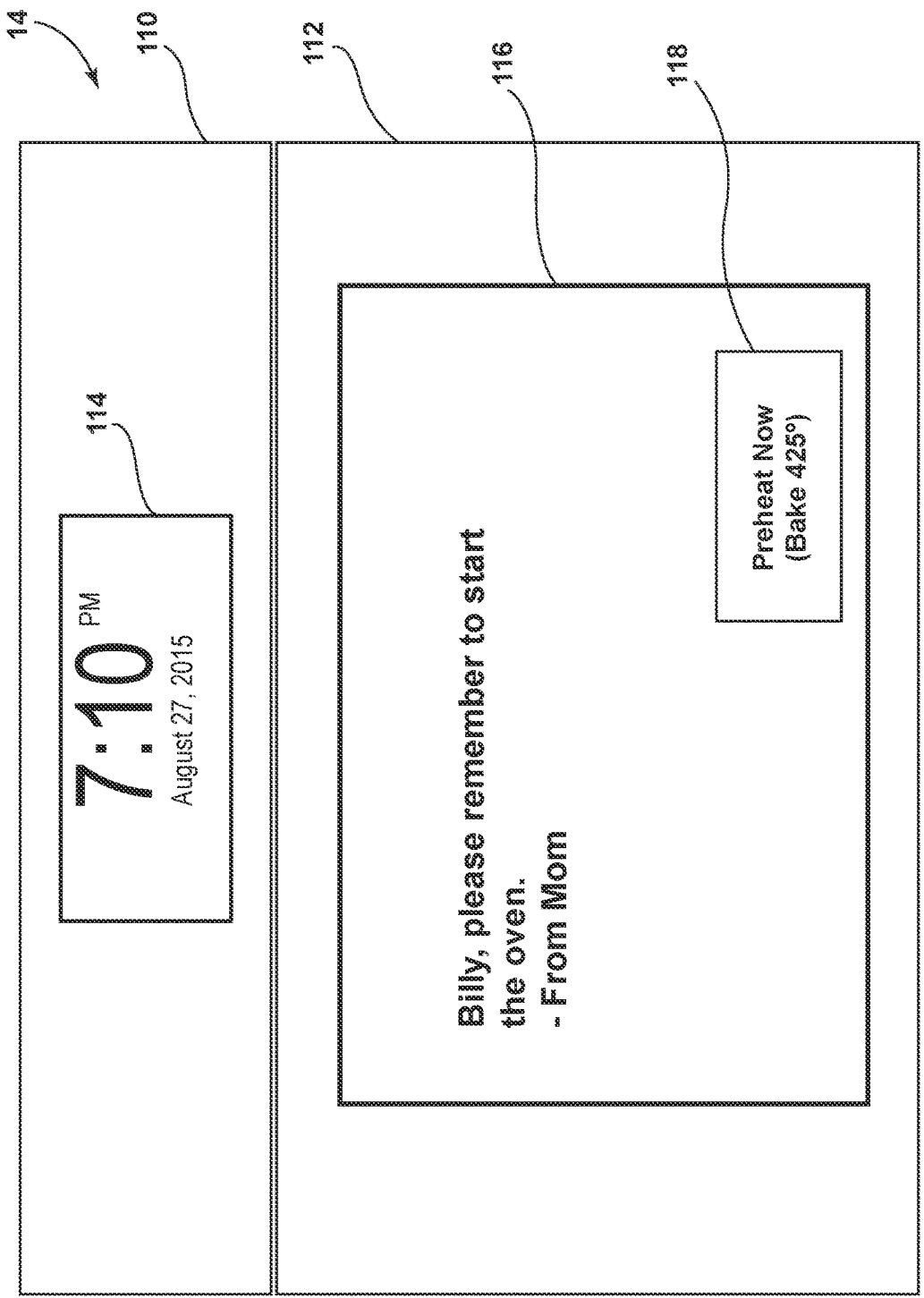
FIG. 3 is a view of an appliance interactive display having a message with an embedded interactive element.

Turning now to FIG. 3, an exemplary appliance interactive display 14 is illustrated having a title section 110 and an operational section 112. The title section 110 can have a display window 114 showing general information such as the time and date. The operational window 112 can display a message 116 having an embedded interactive element 118. The message 116 can be a text message, SMS, or MMS message or data received at the appliance 12 translated as a message 116.

In the example shown in FIG. 3, the message is sent from the mobile device 18 or the server 22, when the mobile communication module 28 or the server communication 23 is in communication with the appliance communication module 24. The message 116, for example, can be a text message from a user, sent from the mobile device 18. In another example, the message can be generated on an application on the mobile device 18. The message 116 can have non-interactive details, such as text, images, audio, or video. The message 116 further includes an embedded interactive element 118. The embedded interactive element 118 can comprise a functionality embedded into the message 116. The functionality can relate to the operation of the appliance 12, such as a cycle of operation as well as particular parameters related to the cycle. In the example shown, the appliance 12 can be an oven. The embedded interactive element 118 can be activated by the user, such as by pushing the embedded interactive element 118 on a touch screen. Upon activating the embedded interactive element 118, the appliance operates according to the embedded interactive element's functionality, such as to preheat the oven to 425-degrees as illustrated in FIG. 3. Upon activating the embedded interactive element 118, the oven begins to heat to 425-degrees and can be preheated for cooking.

Furthermore, activation of the embedded interactive element 118 can initiate a return message from the appliance 12. The return message can be based upon user inputs. The response message can be sent to the source of the initial message, being the mobile device 18 or the server 22, informing the sender of reception of the message.

While FIG. 3 is illustrated relating to an oven, it is contemplated that the embedded interactive element 118 can be displayed on any appliance. Additionally, while it is illustrated as preheating an oven to 425-degrees, the embedded interactive element 118 can be directed to performing any cycle of operation or any other functionality within the appliances capabilities. One additional example can include starting a defrost cycle for a refrigerator or refrigerated compartment therein.

Figure 4:
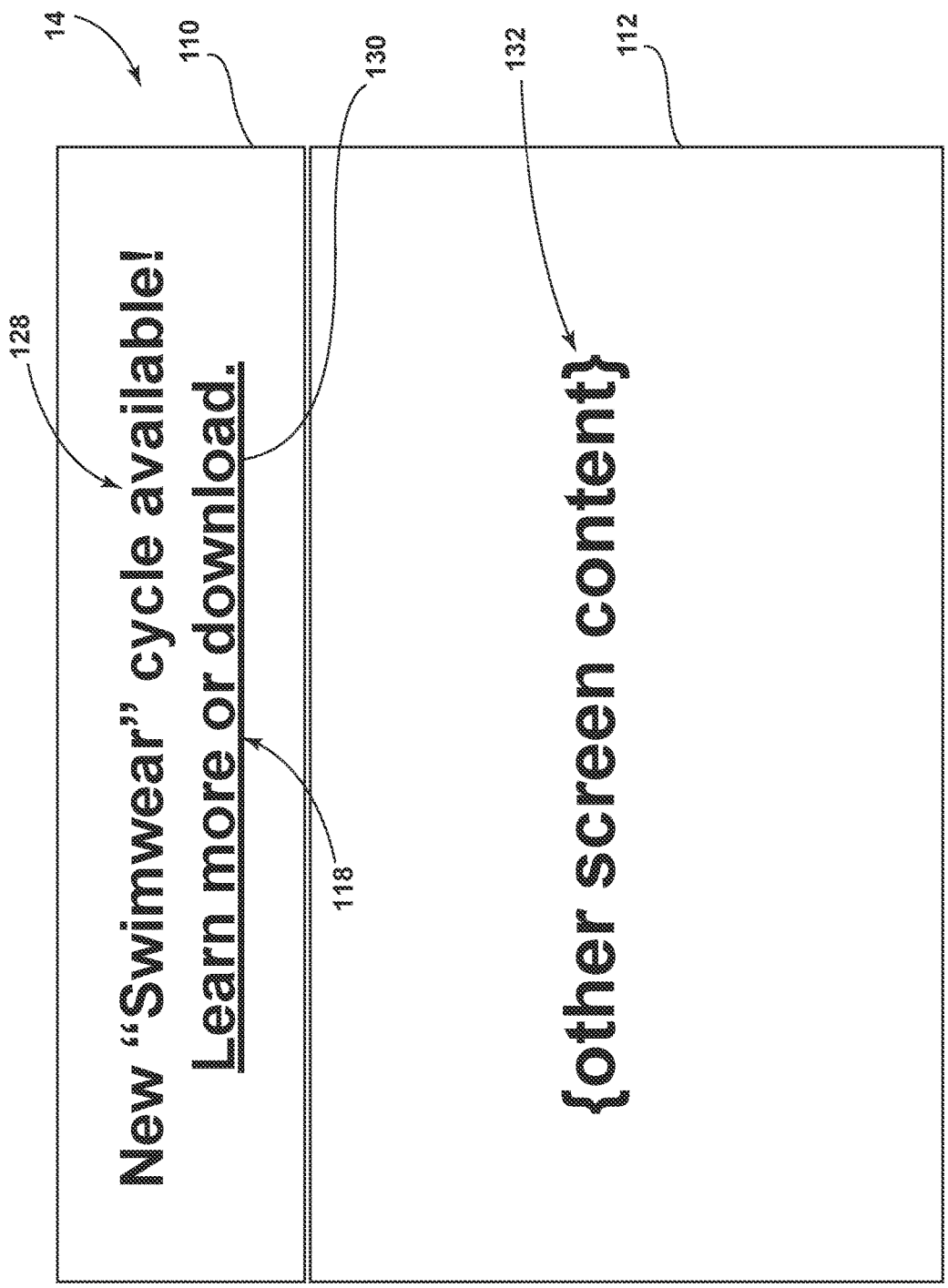
FIG. 4 is a view of the appliance interactive display having a link as the embedded interactive element.

In a second example shown in FIG. 4, a message 128 can be displayed within the title section 110. The message 128 can be a text-based message having an embedded link 130 as the embedded interactive element 118. A user can activate the embedded link 130, for example, by touching the embedded link 130 on a touch screen. Activation of the embedded link 130 serves to direct the appliance to perform a functionality based upon the embedded interactive element 118.

In the example shown in FIG. 4, activating the embedded link 130 instructs the appliance to display information related to a new swimwear cycle for a washing machine or to download additional software related to functional operation of a swimwear cycle for a washing machine. Additionally, activation of the link can serve to begin a cycle of operation on the appliance, such as starting a wash cycle on the washing machine. The operational section 112 can display other screen content 132, such as standard operational functionalities or information related to typical operation of the appliance 12.

Figure 5:
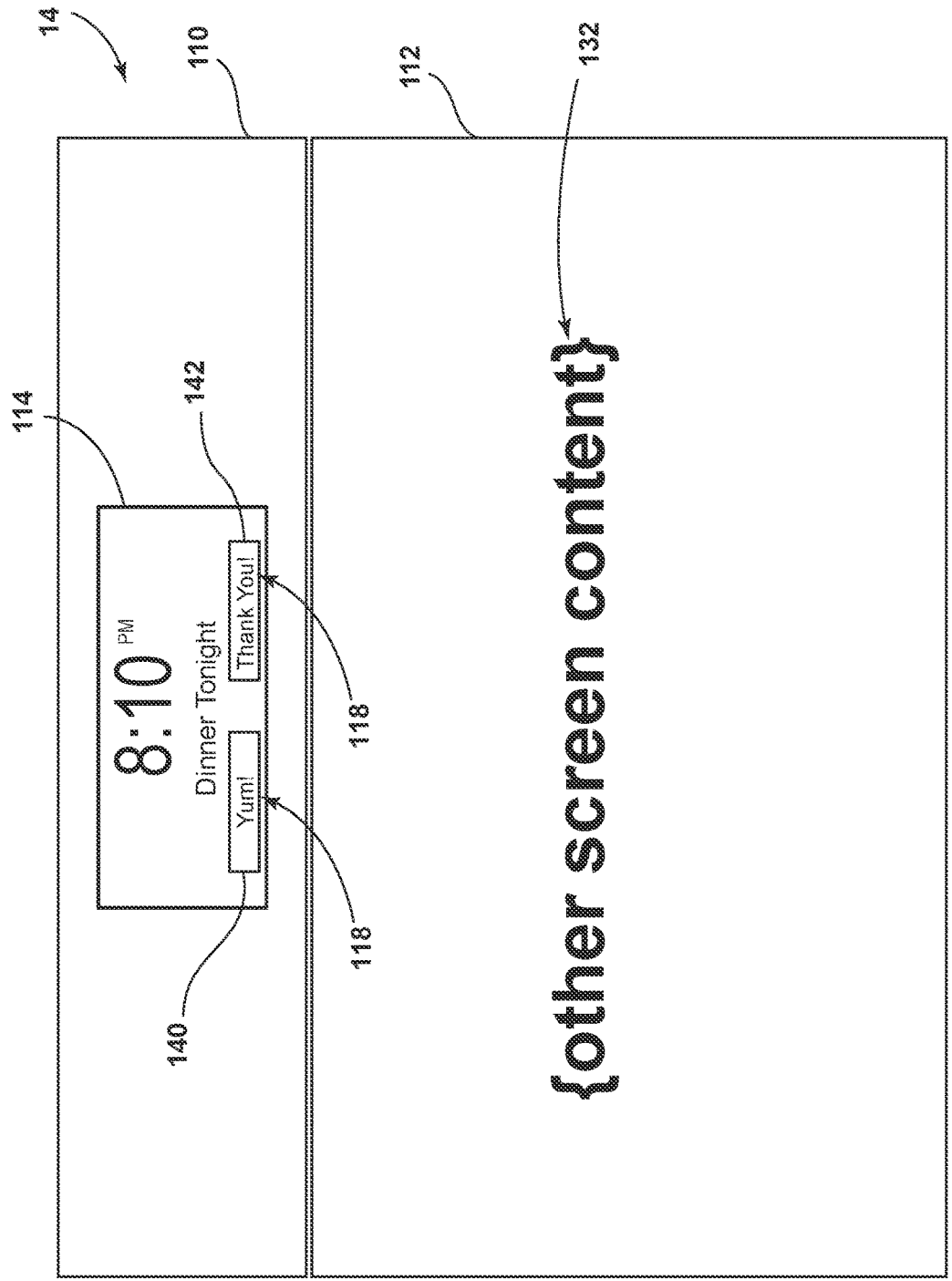
FIG. 5 is a view of the appliance interactive display having the embedded interactive element near a title section.

Turning to FIG. 5, the display window 114 can also display a message comprising embedded interactive elements 140, 142 as feedback or response functionalities. As illustrated, the embedded interactive elements 140, 142 can be responsive to a message sent to the appliance. For example, a dinner message can be sent to the appliance with potential responses, illustrated at "Yum!" and "Thank You!" for providing feedback related to a particular task or operation that was completed, related to the appliance 12. In the example shown, an oven can display responsive embedded interactive elements 118 relating to a completed dinner cooked in the oven. The responses can be utilized as feedback information particular to a user, the appliance, or the particular operation performed by the appliance, such as cooking a particular meal. The appliance 12 can transmit the feedback to the mobile device 18 or the server 22 when the mobile communication module 28 or server communication module 23 is in communication with the appliance communication module 24. For example, a user can press "Thank You!" to send a message to a cook's mobile device 18 showing appreciation for the meal. Alternatively, selection of the "Yum!" button can transmit data to a database providing a rating for the meal that was cooked.

Figure 6:
FIG. 6 is a view of the appliance interactive display having a response related to an interaction with the embedded interactive element.

Additionally, as shown in FIG. 6, an appliance can display a response message 150 based upon operating the embedded interactive element 118. For example, when a user selects the "Thank You!" button, the response message 150 displays the operation of the embedded interactive element. Alternatively, the message 150 can be sent to a mobile device 18 for displaying the response message 150 being activated on the appliance 12. It is further contemplated that the response message 150 can be displayed on a third-party platform, such as social media or a blog.

Furthermore, it is contemplated that the embedded interactive element 118 can be acknowledging of a user performed task related to the particular appliance. For example, the message can include an instruction to an elderly relative to remove an item from the freezer to defrost. Upon completion of removal of the frozen item, the elderly relative can activate the embedded interactive element 118, sending a return message to the sender that the frozen item has been removed to defrost.

It should be understood that FIGS. 3-6 are by way of example, illustrating an appliance receiving a message with an embedded interactive element 118, displaying a message based upon interaction with an embedded interactive element 118, or activating a functionality of an appliance based upon an embedded interactive element 118 disposed within a message. It should be further understood that the concepts discussed herein are not so limited and have applicability in a plurality of appliances 12 and can be displayed in multiple different ways. Additionally, the functionalities of the embedded interactive element 118 are not limited to the examples as described, functionalities can include, but are not limited to, particular functionalities of the appliance, such as a cycle of operation or a setting, displaying information to a user, updating, downloading, installing, or modifying the software of a particular appliance, or providing feedback to a user of the appliance or from the appliance to a remote user on a mobile device 18 or a server 22.

Figure 7:
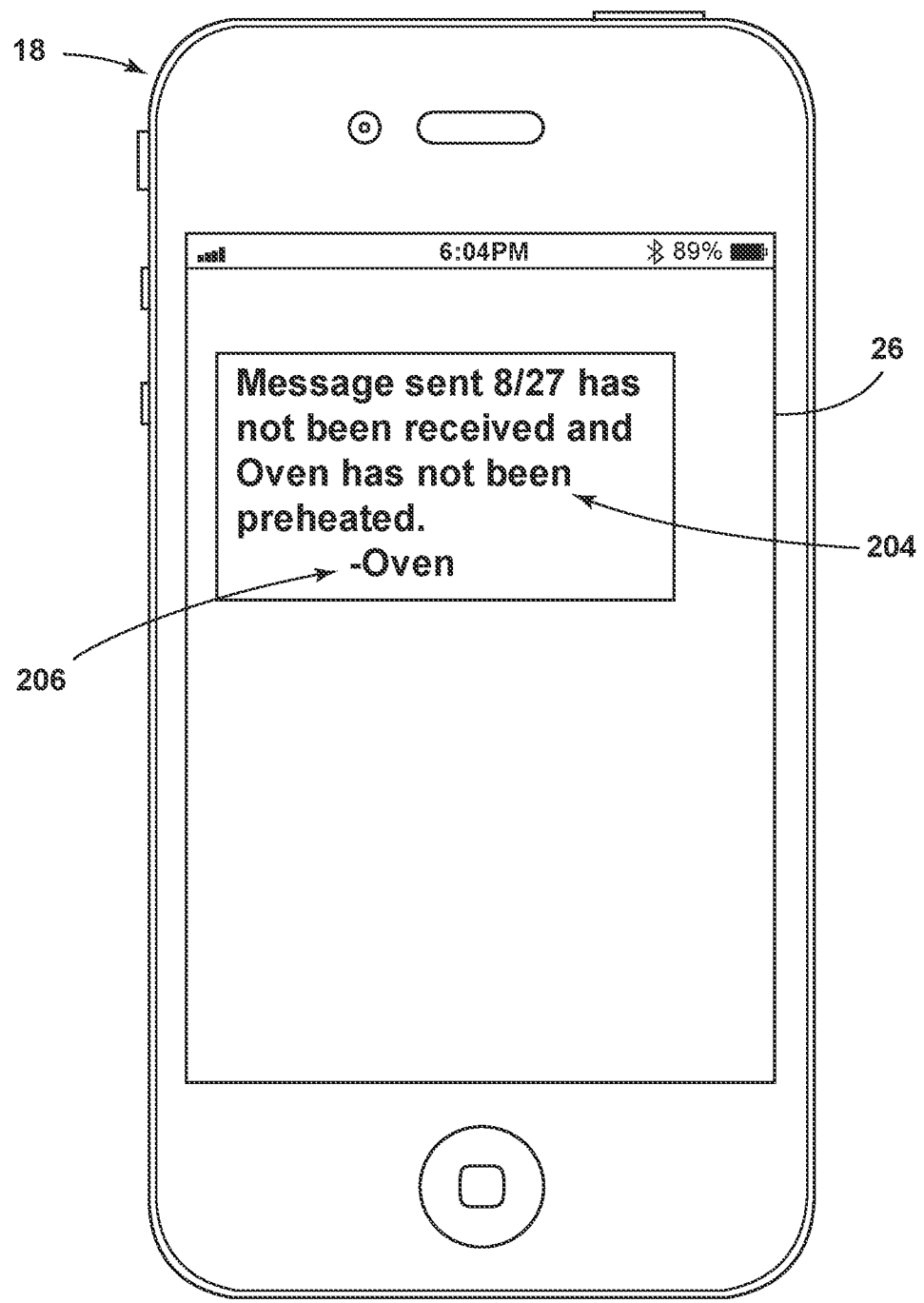
FIG. 7 is a view of a mobile interactive display illustrating a response message regarding response to the embedded interactive element.

Turning to FIG. 7, the mobile device 18 can also display a return message 204 relating to the operation of the embedded interactive element 118 or a lack of activation of the embedded interactive element 118. The return message 204 can also have a signature 206, related to the particular appliance 12 from which the message originated. For example, in FIG. 7, if the embedded interactive element 118 of FIG. 3 was not activated, the oven can send a return message 204 to the mobile device 18 stating that the oven has not been preheated to 425-degrees. This return message 204 can be based upon a particular time in which the embedded interactive element 118 has not been activated, which can be 60 minutes or can be configured by the user. The return message 204 can also contain related information such as when the message was sent or what operation the embedded interactive element 118 was related to in non-limiting examples. Furthermore, the return message can comprise a list or review of completed tasks related to the activation of one or more interactive elements 118 among one or more appliances 12.

Alternatively, the return message 204 can be representative of comments or feedback from a user entered through the embedded interactive element 118. For example, if the "Yum!" embedded interactive element 140 of FIG. 5 is activated, the return message 204 can be sent to the mobile device 18 stating that a user has responded to the meal with "Yum!"

Figure 8:
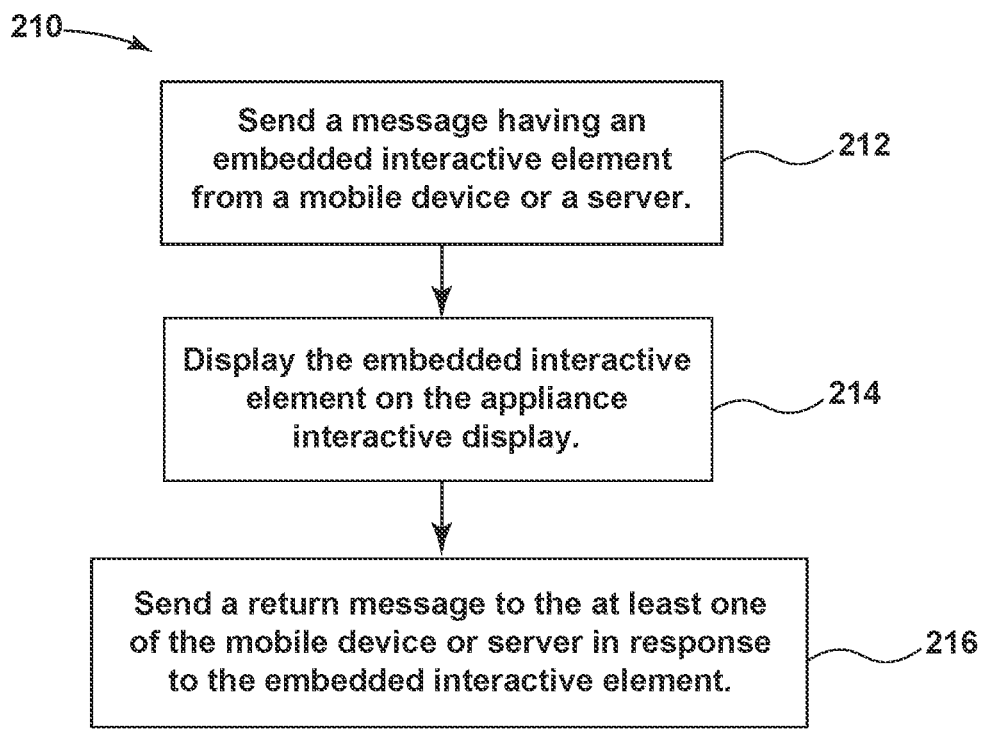
FIG. 8 is a flow chart illustrating a method of communication between the appliance and a mobile device utilizing an embedded interactive element.

Turning now to FIG. 8, a method 210 for communicating among at least one appliance, server, and mobile device is illustrated. The at least one appliance 12 can have an appliance interactive display 14 and an appliance communication module 24, the server 22 can have a server communication module 23, and the mobile device 18 can have a mobile interactive display 26 and a mobile communication module 28. The method 210, at 212, comprises sending a message having an embedded interactive element 118 from at least one of the mobile device 18 or server 22 to the at least one appliance 12. The message can comprise a text message, SMS, MIMS, or similar message, as well as generated data that displayed on the appliance interactive display 14 as the message. The message can be generated at a user interface designed with the mobile device 18 or the server 22, or can be generated via an application which can be operated on the mobile device 18 or the server 22.

At 214, the appliance interactive display 24 displays the message and embedded interactive element 118. The appliance interactive display 24 displays the message and embedded interactive element 118 in any matter suitable for identification by a user local to the appliance 12 and suitable for interaction with the embedded interactive element 118.

At 216, a local user interacts with the embedded interactive element 118, such as pushing or touching the embedded interactive element 118 on a touch screen comprising the appliance interactive display 24. Upon interaction with the embedded interactive element 118, the appliance 12 sends a return message 204 in response to the mobile device 18 or server 22 from which the message originated. The appliance 12 can also send an alert message as the return message 204 if the embedded interactive element 118 is not activated or has not been activated within a predetermined time. The alert message can contain details or information that the embedded interactive element 118 has not been activated.

The embedded interactive element 118 can be executed a function of the appliance 12, such as a cycle of operation. Additionally, the embedded interactive element 118 can be a link, which, upon activation, can download an application or functionality for the appliance or start a cycle of operation.

To the extent not already described, the different features and structures of the various embodiments can be used in combination with each other as desired. That one feature may not be illustrated in all of the embodiments is not meant to be construed that it may not be, but is done for brevity of description. Thus, the various features of the different embodiments can be mixed and matched as desired to form new embodiments, whether or not the new embodiments are expressly described. All combinations or permutations of features described herein are covered by this disclosure. It should be appreciated that the aforementioned method can be used within alternative appliances.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A communication system comprising:
    a home appliance configured to perform a cycle of operation including an appliance interactive display coupled to an appliance communication module; and
    a source in communication with the home appliance configured to send an interactive message including an embedded interactive element to the home appliance;
    wherein the appliance communication module is configured to receive the interactive message from the source and the embedded interactive element is configured to operate a functionality of the appliance; and
    wherein a return message is sent that relates to a post-cycle of operation of the embedded interactive element.

2. The communication system of claim 1 wherein the post-cycle of operation comprises one of feedback or comments from a user.

3. The communication system of claim 1 wherein the source is one of a mobile device or a server.

4. The communication system of claim 3 wherein the source receives the return message.

5. The communication system of claim 1 wherein the home appliance receives the interactive message from at least one of a mobile device or server.

6. The communication system of claim 1 wherein the return message is sent from the home appliance.

7. The communication system of claim 1 wherein the return message is an alert message that the embedded interactive element has not been activated.

8. The communication system of claim 7 wherein the alert message is sent after a predetermined time.

9. The communication system of claim 1 wherein the embedded interactive element includes a link to download an application or start the cycle of operation.

10. The communication system of claim 1 wherein the embedded interactive element is displayed at the appliance interactive display.

11. A method of operating an appliance having an appliance interactive display coupled to an appliance communication module, the method comprising:
    receiving in the appliance communication module an interactive message including an embedded interactive element having a functionality of the appliance embedded into the interactive message;
    displaying the interactive message including the embedded interactive element on the appliance interactive display; and
    sending a return message that relates to a post-cycle of operation of the embedded interactive element.

12. The method of claim 11 wherein the post-cycle of operation comprises one of feedback or comments from a user.

13. The method of claim 11 wherein the return message is sent when the embedded interactive element is activated.

14. The method of claim 11 wherein the return message is sent from the appliance.

15. The method of claim 11 wherein the return message is sent to a source of the interactive message.

16. The method of claim 11 wherein the sending the return message is initiated by user input received at the appliance interactive display.

17. The method of claim 16 wherein the user input is an activation of the embedded interactive element.

18. A home appliance configured to perform a cycle of operation and connected to a home network comprising:
    an appliance interactive display coupled to an appliance communication module;
    wherein the appliance communication module is configured to receive an interactive message having an embedded interactive element that is configured to operate a functionality of the home appliance; and
    wherein a return message is sent that relates to a post-cycle of operation of the embedded interactive element.

19. The home appliance of claim 18 wherein the post-cycle of operation comprises one of feedback or comments from a user.

20. The home appliance of claim 18 wherein the interactive message is sent from a source.

21. The home appliance of claim 18 wherein the return message is sent from the home appliance.

* * * * *